US005523758A

United States Patent [19]

Harmuth

[11] Patent Number: 5,523,758
[45] Date of Patent: Jun. 4, 1996

[54] SLIDING CORRELATOR FOR NANOSECOND PULSES

[75] Inventor: Henning F. Harmuth, Potomac, Md.

[73] Assignee: Geophysical Survey Systems, Inc., North Salem, N.H.

[21] Appl. No.: 469,958

[22] Filed: Jan. 25, 1990

[51] Int. Cl.$^6$ .................................................. G01S 13/00
[52] U.S. Cl. ........................ 342/22; 342/189; 364/823; 364/728.01; 364/604
[58] Field of Search ................. 342/22, 189; 364/823, 364/824, 728.01, 728.02, 728.03, 728.06, 604

[56] References Cited

U.S. PATENT DOCUMENTS

| 4,400,790 | 8/1983 | Chambers et al. | 364/604 |
| 4,813,006 | 3/1989 | Burns et al. | 364/604 |
| 4,907,001 | 3/1990 | Harmuth | 342/189 X |

FOREIGN PATENT DOCUMENTS

| 4612222 | 11/1966 | Japan | 364/824 |

OTHER PUBLICATIONS

Dr. J. Eldon; "A ZoMHz Single Chip Digital Correlator"; Electronic Engineering; Mar. 1981; pp. 41–50.

H. C. Goodrich et al.; "Analog to Digital (Rolling Sample) Correlator"; RCA Technical Notes; TN No. 893; Jul. 8, 1971; pp. 1–3.

Primary Examiner—David C. Cain
Attorney, Agent, or Firm—Wolf, Greenfield & Sacks

[57] ABSTRACT

A digital sliding correlator having means for producing a series of time-shifted stored copies of a digital character, means responsive to said shifted, stored copies of the character for multiplying said shifted, stored copies by the input signal or the sign-inverted counterpart of the input signal, a first set of integrators and a second set of integrators, means for supplying to the first set of integrators first portions of said multiplied signals and for supplying to said second set of integrators second portions of said multiplied signals, and means for combining the outputs of said integrators.

3 Claims, 6 Drawing Sheets

SLIDING CORRELATOR FOR NANOSECOND PULSES

FIELD OF THE INVENTION

This invention relates to the selective reception of radio signals consisting of a sequence of carrier-free pulses. More particularly, it relates to the reception of carrier-free radar signals using a sliding correlator for detecting pulse sequences in which pulse duration may be 1 ns or less.

BACKGROUND OF THE INVENTION

Conventional radio signals are produced by amplitude- or frequency-modulation of a sinusoidal carrier with a baseband signal. Signals from different sources can be distinguished by using different carrier frequencies. Selective reception is accomplished by means of filters that will resonate with the carrier having a chosen frequency, but not with any other carrier. This is the basis of selective transmission and reception of conventional radio signals.

For certain applications, such as a radar that can penetrate seawater or absorbing materials, one cannot use sinusoidal carriers. Instead, one can use signals that consist of a sequence of pulses—which for simplicity may be visualized as rectangular binary pulses—and assign different sequences of pulses to different users. Selective reception then requires that a particular sequence of pulses is recognized in the presence of noise and many other signals, while all other pulse sequences are rejected. It is known that this can be accomplished in principle by a sliding correlator. Such correlators have been built for years for pulse durations of 100 ns and longer. However, for carrier-free radar, one needs sliding correlators that can process pulses with a duration of about 1 ns or less.

Sliding correlators for the processing of analog signals—which may be originally sequences of digital pulses that have been distorted and have superimposed noise as well as unwanted signals—generally use either analog delay devices or acousto-optical devices. In either case, the minimum duration of pulses that can be processed is on the order of 100 ns or more, while the theoretically foreseeable minimum duration is a few nanoseconds. It is important to observe that we are concerned with analog signals; sliding correlators for digital pulse sequences or "characters" (as used in computers) can work must faster. The reason for this difference in speed is that the digital pulse sequences require digital delay circuits, usually referred to as digital shift registers, rather than analog delay devices which contain typically relatively slow electro-acoustic, acousto-optic, or charge-coupled devices.

Accordingly, it is an object of the present invention to provide a sliding correlator which can process pulses of 1 ns duration, or less.

Yet another object of invention is to use digital delay devices instead of analog delay devices in sliding correlators for analog signals.

The foregoing and other objects and advantages will be more fully understood from the detailed description below, which should be read in conjunction with the accompanying drawing.

The foregoing and other objects of the invention are achieved with a digital sliding correlator having means for producing a series of time-shifted stored copies of a digital character, means responsive to said shifted, stored copies of the character for multiplying said shifted, stored copies by the input signal or the amplitude-inverted counterpart of the input signal, a first set of integrators and a second set of integrators, means for supplying to the first set of integrators first portions of said multiplied signals and for supplying to said second set of integrators second portions of said multiplied signals, and means for combining the outputs of said integrators.

DETAILED DESCRIPTION

Principle of Sliding Correlator Used as Selective Receiver

The purpose of a sliding correlator is to produce auto- or cross-correlation functions of a stationary function and a function "sliding" past it. The term "auto-correlation function" is used if the stationary function and the sliding function are the same, while the term "cross-correlation function" is used when they are not the same. The peak of the auto-correlation function is greater than the peak of any cross-correlation function under certain conditions that, in terms of engineering, imply equal energy of all received signals in a certain time interval. The difference between the peak of the auto-correlation function and the peaks of all cross-correlation functions makes the sliding correlator suitable as a selective receiver for one signal out of many different arriving signals. The sliding correlator can be viewed as a generalization of the resonant filter used in radio transmission for the selective reception of a sinusoidal wave with a certain frequency and the rejection of all sinusoidal waves with other frequencies. Instead of sinusoidal waves, the sliding correlator can selectively receive a wave with essentially any chosen time variation and reject waves with any other time variation.

Figure 1:
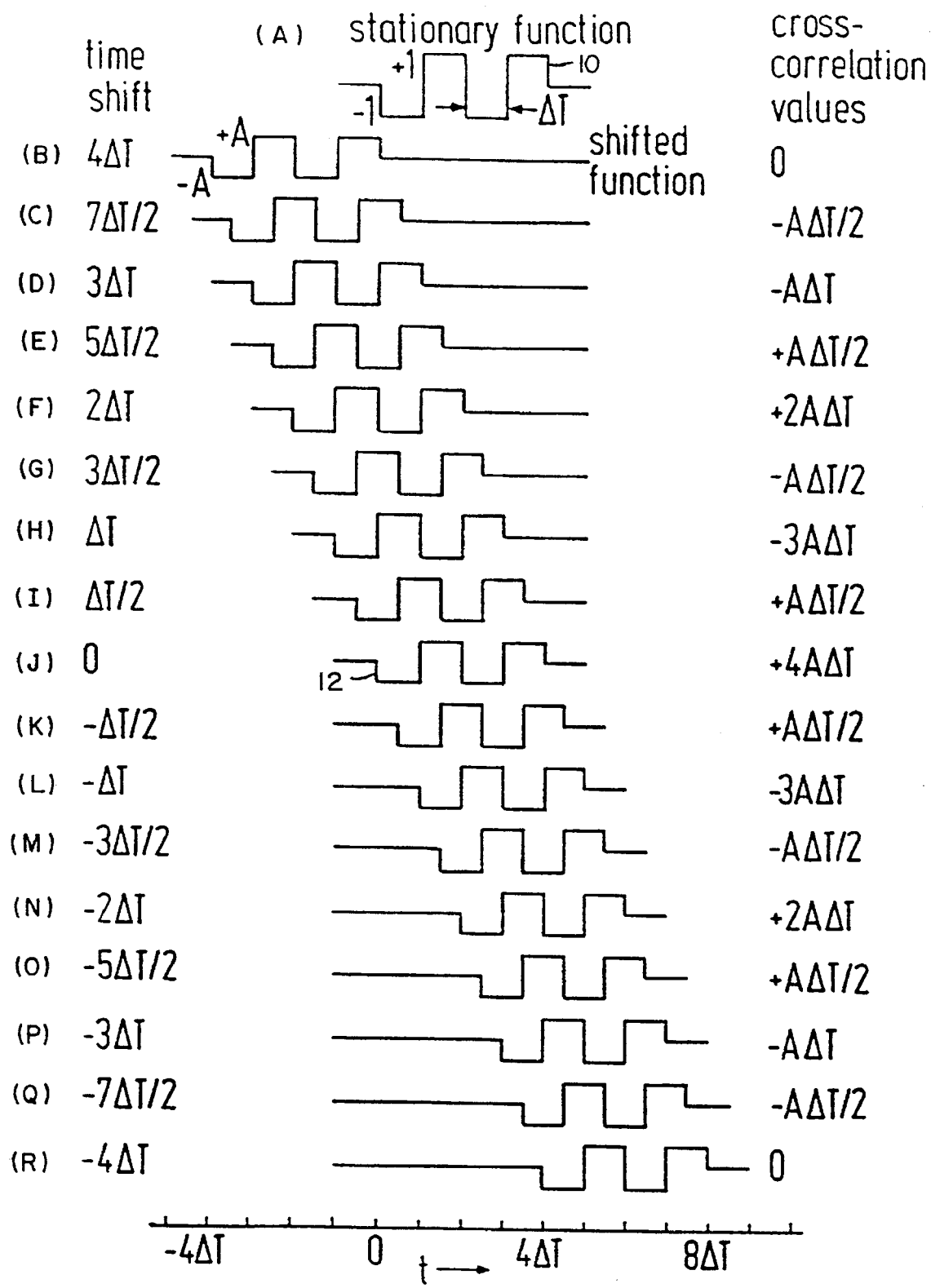
FIG. 1 is a time diagram of a sliding correlator that shows how a time function consisting of four pulses is shifted past a stationary function having the same sequence of pulses.

For an explanation of the correlation process, reference may be made to FIG. 1. A "stationary function" 10 is shown on top at A and shifted functions with time shifts from $4\Delta T$ to $-4\Delta T$ below at B–R. Consider the shifted function 12 for the time shift 0, at J. Its multiplication with the stationary function 10 yields $+A$ for any time in the interval from 0 to $4\Delta T$. If we integrate the product, we get $+4A\Delta T$, which is the cross-correlation value shown on the right of part J of FIG. 1. All the other cross-correlation values listed in FIG. 1 are obtained in the same way by multiplication of the stationary function 10 with a shifted function and integration of the product.

Figure 2:
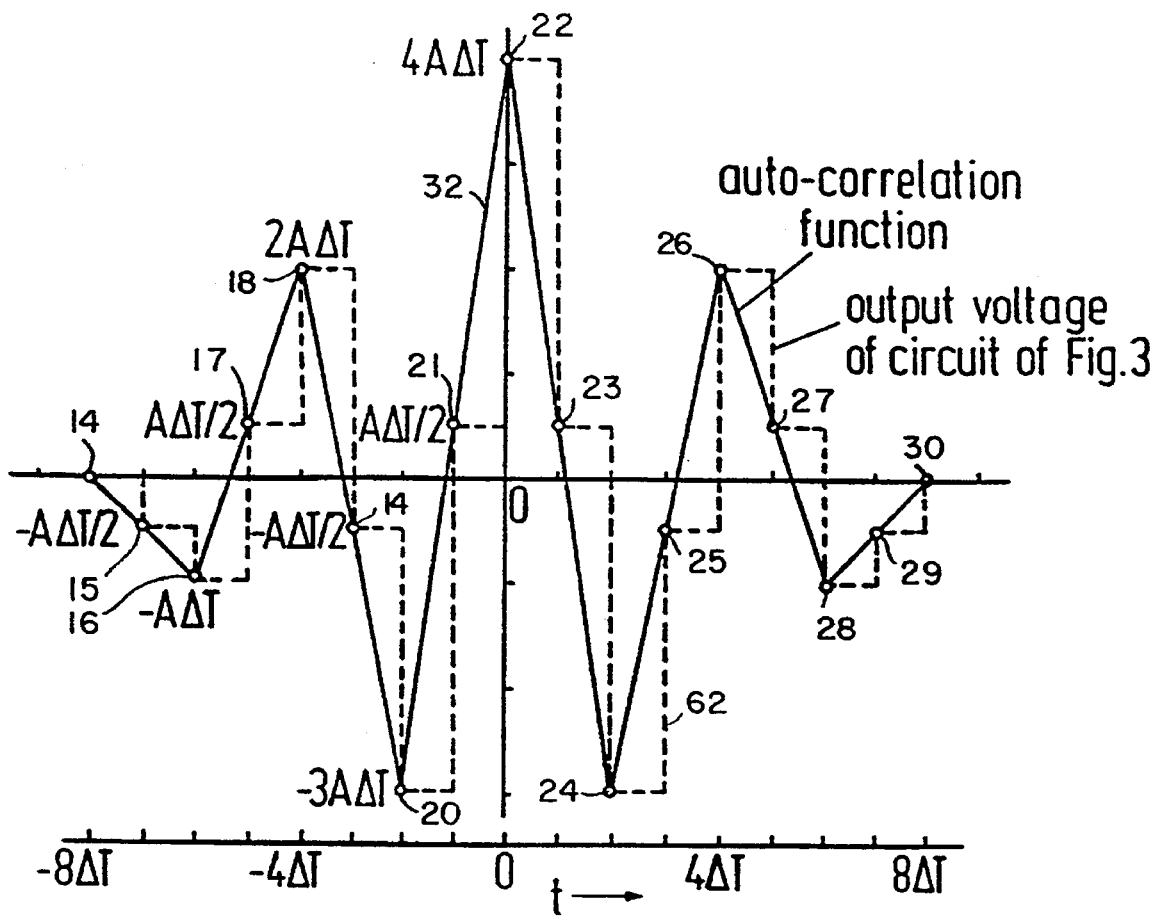
FIG. 2 shows the auto-correlation function (solid line) of the stationary function of FIG. 1. The points indicated by small circles are the cross-correlation values listed in FIG. 1. The dashed line shows the output voltage of a sliding correlator that shifts signals in multiples of the time $\Delta T/2$ according to FIG. 1.

FIG. 2 shows the cross-correlation values of FIG. 1 as a function of the time shifts, by small circles 14–30. If these time shifts were not in increments of ΔT/2 but instead were infinitesimally small, one would obtain the auto-correlatin function shown by the solid line 32 in FIG. 2.

If the shifted function in FIG. 1 were not a sequence of rectangular pulses with amplitudes −A, A, −A, +A, but instead were one of the other 15 possible sequences +A, +A, +A, +A to −A, −A, −A, −A, one would get 15 cross-correlation functions that are similar to the auto-correlation function of FIG. 2, but their peak values would be less than 4AΔT. Hence, we have here an effect that permits the detection of a function that is equal to a chosen "stationary function."

Typical Sliding Correlator for Analog Signals

The functions in FIG. 1 represent digital binary pulse sequences or "digital binary characters". Let such a binary character be transmitted. It will arrive at the receiver with distortions, superimposed noise, and superimposed unwanted signals. Hence, the transmitted digital binary character arrives as an "analog signal". However, the selective reception by cross-correlation with a stationary function or a "stored copy of the digital binary character" still works. Rather than definitely selecting the transmitted digital binary character it will select signals that deviate only by a chosen amount from the stored copy of the digital binary charcter, in the sense of a least-mean-square difference.

Figure 3:
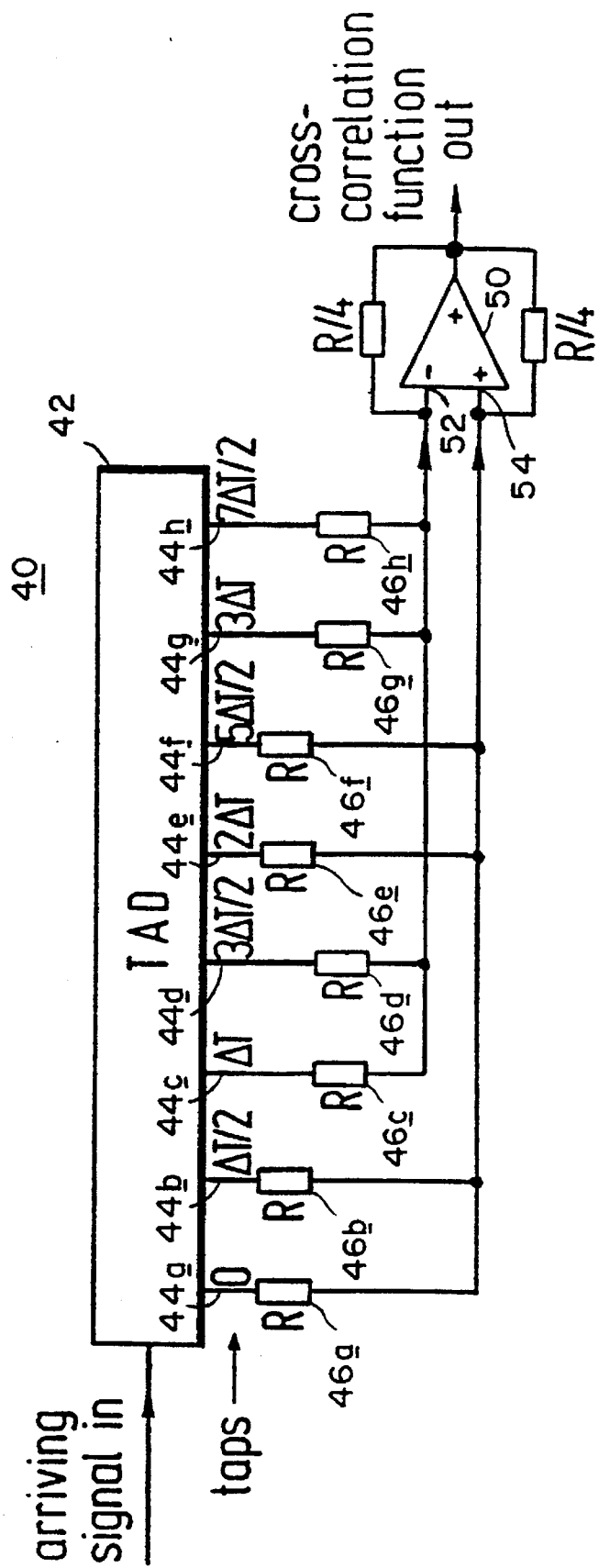
FIG. 3 shows a typical circuit of a sliding correlator.

A typical circuit for an analog sliding correlator 40 is shown in FIG. 3. The arriving analog signal is fed into a tapped analog delay circuit "TAD" 42. If this is a coaxial delay line, the signals at the taps 44a–44h will equal the shifted functions in FIG. 1 parts B–R except for distortions, superimposed noise, and superimposed unwanted signals. The stationary function 10 in FIG. 1 is represented by the eight resistors 46a–46h of resistance R leading to the sign-inverting (−) and non-inverting (+) input terminals of an operational amplifier 50.

Figure 4:
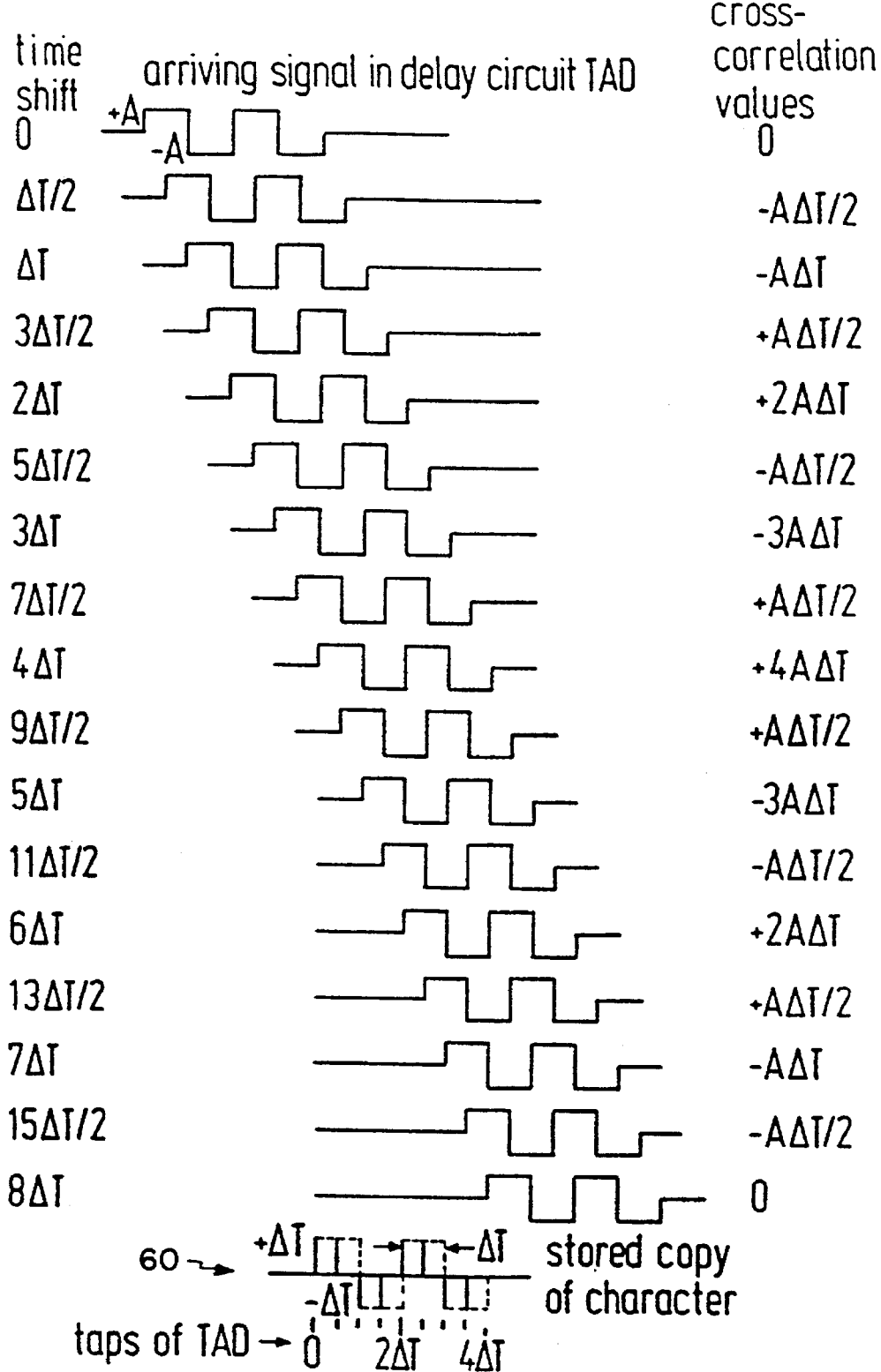
FIG. 4 shows a time diagram for the output of the circuit of FIG. 3.

Since the eight resistors 46a–46h are connected to eight taps along the delay circuit separated by time ΔT/2 between them, the stationary function 10 in FIG. 1 must be replaced by a sampled function with 8 samples, as shown by the "stored copy of character" 60 in FIG. 4. If we assign to the samples the values +ΔT or −ΔT, we obtain in FIG. 4 (right-hand column) the same cross-correlation values as in FIG. 1. Hence, FIG. 4 is the time diagram for the sliding correlator 40 of FIG. 3 with discrete taps of the delay circuit.

The output voltage of the circuit of FIG. 3 is represented by the dashed line 62 in FIG. 2. It is evident how the auto-correlation function is approximated and that more taps of the delay circuit 42 would yield a better approximation.

Circuits according to FIG. 3 work well for pulse durations ΔT equal to about 100 ns and more. The tapped analog delay circuit prevents the use of this circuit for pulses with a duration of 1 ns and less. Tapped analog delay circuits are currently based on acoustic delay devices or on charge-coupled delay circuits, which will not permit operation with pulses of about 1 ns duration in the foreseeable future. A different implementation of sliding correlators is based on acousto-optical devices. Here again, the acoustic effects limit their use to pulses with a duration of at least a few nanoseconds in the foreseeable future.

In order to obtain faster sliding correlators, one must avoid acoustic devices and one must avoid analog delay devices. Digital delay devices, usually referred to as digital shift registers, and switches, work much faster. They can currently be built for pulses with a duration of about 1 ns and the development of high electron mobility and ballistic electron technologies promises possible operation with pulse duration as short as 100 ps in the foreseeable future.

Sliding Correlator Using Digital Shift Registers and Switches

The circuit 40 of FIG. 3 delays the received analog signal while the stored copy of the (digital binary) character is not delayed, but is represented by the resistors 46a–46h and the two input terminals of the operational amplifier 50. The problem of insufficient speed would be solved if the stored digital character could be delayed, instead of the received analog signal. Previously, the "stationary function" 10 of FIG. 1 had been related to the "stored copy of character" 60 in FIG. 4 and the "shifted function" to the "arriving signal in delay circuit TAD." Now we relate the "stationary function" to the "arriving signal" in the time diagrams of FIGS. 5a and 5b and the "shifted function" to the "shifted copies of character".

Figure 5:
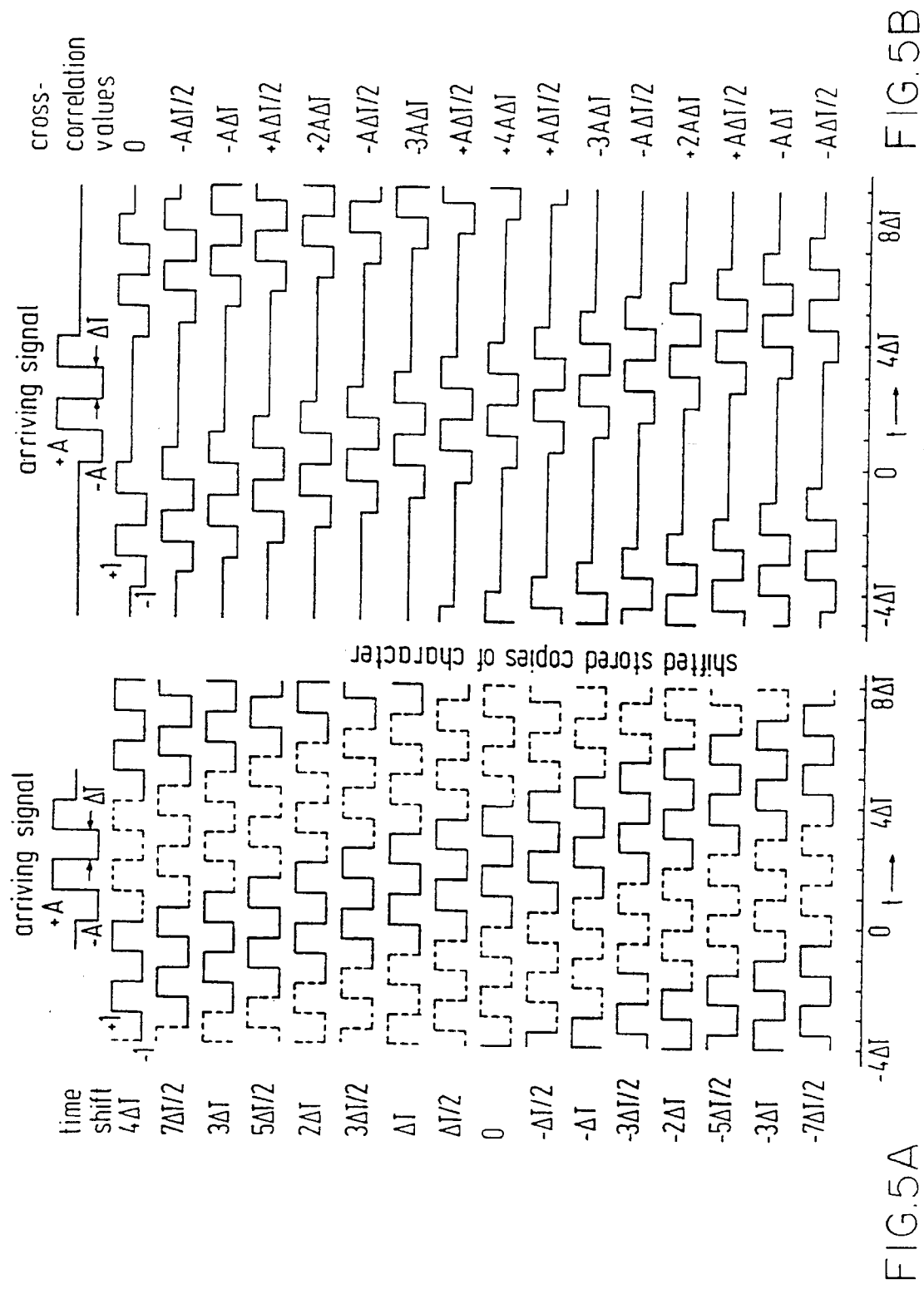
FIGS. 5a and 5b are time diagrams used to explain the operation of a sliding correlator according to the present invention.

Consider first FIG. 5b. If the "arriving signal" is multiplied with the "shifted stored copies of character" and the products are integrated, the same cross-correlation values are obtained as in FIG. 1. The "shifted stored copies of character" in FIG. 5b cannot be produced directly with the current binary semiconductor technology, but the periodically repeated characters of FIG. 5a are easy to produce by a digital shift register with eight stages and a feedback loop from the last stage to the first stage. The "arriving signal" can be multiplied as in FIG. 5a, but the products produced by the dashed sections of the "shifted stored copies of character" must be separated from those produced by the solid sections. This separation is easily done by a switch.

Figure 6:
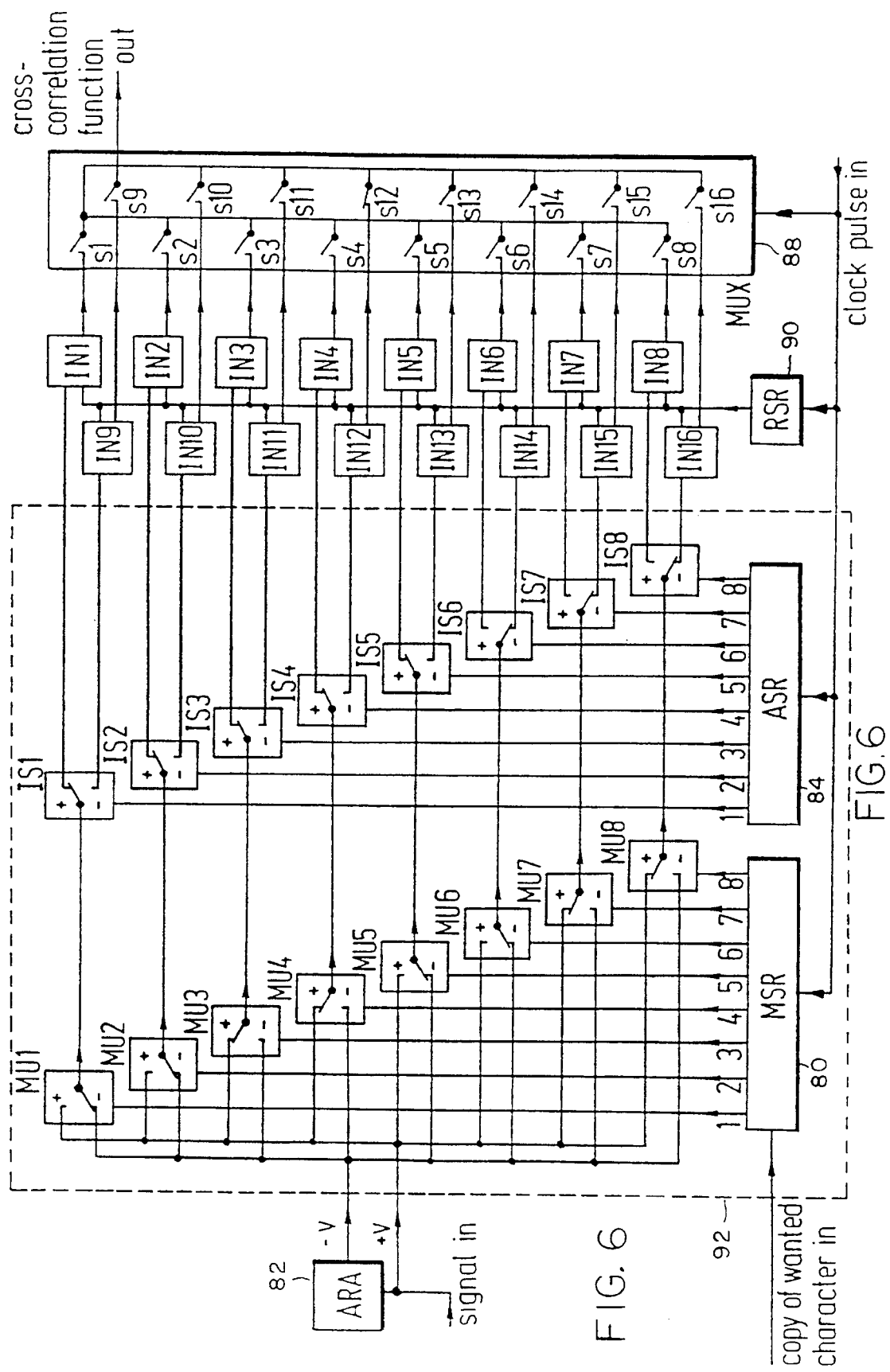
FIG. 6 shows a block diagram of an embodiment of a sliding correlator according to the present invention.

FIG. 6 shows the block diagram of a sliding correlator that implements the time diagram of FIG. 5a. The "shifted stored copies of character" are produced by the multiplier shift register (MSR) 80 with eight stages and a feedback loop from stage 8 to stage 1. Let the binary character −−++−−++ or 00110011 be initially fed into this shift register. A clock pulse at multiples of ΔT/2 will produce at output terminal 1 of MSR80 in FIG. 6 the pulse sequence with time shift 4ΔT in FIG. 5a. At output terminals 2–8 of MSR, the functions with time shifts 7ΔT/2, 3ΔT, ... , −7ΔT/2 of FIG. 5a respectively will be obtained.

The functions with time shift 0, −ΔT/2, ... , −7ΔT/2 in FIG. 5a are equal to those with time shift 4ΔT, 7ΔT/2, ... , ΔT/2. Hence, we need only a shift register with eight stages to produce the sixteen shifted functions of FIG. 5a.

Consider the multiplications of the arriving signal by +1 or −1. First, the signal is fed through a sign-inverting buffer amplifier, also called an amplitude-reversing amplifier (ARA) 82 in FIG. 6. Multiplication by +1 or −1 means that the switches MU1 to MU8 are set respectively to either + or −, to pass either +v or −v. The switches are set by the outputs of MSR 80 so that an output 1 sets the switch to + and an output 0 sets it to −. Table 1 shows the setting of the switches MU1 to MU8 in the time interval 0 to 8ΔT; the setting is periodically repeated for larger times. By writing 1 for + and 0 for −, one obtains the required outputs at the terminals 1 to 8 of the multiplying shift register MSR in FIG. 6.

For the suppression of the products produced by the dashed sections of the "shifted stored copies of charcter" in FIG. 5a, we need the integrator switches IS1 to IS8 in FIG. 6. These switches are operated by the alternating shift register (ASR) 84 with 16 stages and a feedback loop from stage 16 to stage 1. Only the first eight stages are shown in FIG. 6 since their output terminals are connected to the integrator switches IS1 to IS8 while the ninth through sixteenth stages only provide internal delay. Initially the eight stages 10–16 and 1 are set to a logic "1" output while the remaining eight stages are set to a logic "0" output. Table 1 shows the setting of the integrator switches IS1 to IS8. The symbol "+" means that the product coming from multiplier MU1 in FIG. 6 is fed to integrator IN1, while the symbol "−" means it is fed to integrator IN9. The outputs of the alternating shift register at terminals 1 to 8 are determined by the requirement that a setting of the respective switch IS to + calls for an output 1, while a setting to − calls for an output 0.

Recognize that the solid sections of the functions in FIG. 5a produce products that are integrated in the integrators IN1 to IN8 in FIG. 6, while the dashed sections produce products that are integrated in the integrators IN9 to IN16. This explains why the MSR 80 requires only eight stages, while there are 16 "shifted stored copies of the character" in FIG. 5b.

At the end of the integration interval, the integrators IN1 to IN16 must: be sampled by the switches S1 to S16 of the multiplexer (MUX) 88 in FIG. 6. Table 1 shows the timing of these switches s1 to s16. Finally, the integrators must be reset after sampling. The timing of the reset switches in the integrators IN1 to IN16 is shown in Table 1. Note that much time is available for this resetting, a necessity for accurate results. The reset switches are operated by a shift register (RSR) 90, with 16 stages and a feedback loop from stage 16 to stage 1. The character 0000000000111111 is circulated in this shift register to produce the required outputs for the reset switches in the integrators. The operation of the reset switches and the sampling switches in MUX 88 are standard techniques that require no further elaboration.

The output of the circuit of FIG. 6 is the function shown by the dashed line 62 in FIG. 2. As previously, a better approximation of the auto-correlation function is possible by choosing the clock pulse period not ΔT/2, but ΔT/4, ΔT/8, or a smaller period yet.

Reasons for High Speed Capability

The fast opertions in the circuit of FIG. 6 are provided by the digital shift registers MSR 80 and ASR 84, as well as by the switches MU1 to MU8 and IS1 to IS8. In addition, the sampling switches in the MUX 88 must be fast. No acoustic devices or analog delay devices are needed. All the circuits within the dashed line in FIG. 6 can be built on one semiconductor chip, bringing an enormous reduction of the size of the circuit and a resulting ability for fast operation.

Having thus described the invention and an embodiment thereof, it will be understood that such embodiment was presented by way of example only, and is not intended to be limiting. Various alterations, modifications and improvements may be made without departing from the spirit and scope of the invention. Accordingly, the invention is defined only by the following claims and equivalents thereto.

What is claimed is:

1. A digital sliding correlator having means for producing a series of time-shifted stored copies of a digital character, means responsive to said shifted, stored copies of the character for selectively multiplying said shifted, stored copies by an input signal or a sign-inverted counterpart of the input signal responsive to the input signal, a first set of integrators and a second set of integrators, means for supplying to the first set of integrators first portions of said multiplied signals and for supplying to said second set of integrators second portions of said multiplied signals, and means for combining the outputs of said integrators.

2. A sliding correlation circuit comprising:
   a. a sign-inverting buffer amplifier connected to receive an input signal and provide a sign-inverted counterpart thereof;
   b. a multiplier shift register (MSR) connected to receive a copy of a character representation and providing a plurality of output digits constituting shifted, stored copies of said character representation;
   c. multiplier means connected to receive the input signal and the sign-inverted counterpart thereof, for providing as output, responsive to each output bit of the MSR a first one of the input signal and the sign-inverted counterpart thereof when the output digit is in a first state and the other one of the input signal and the sign-inverted counterpart thereof when the output digit is in a second state;
   d. first and second sets of integrators, each receiving an input and supplying an output;
   e. switching means for supplying to the first set of integrators a first set of outputs from the multiplier means and to the second set of integrators a second set of outputs from the multiplier means; and
   f. means for combining the outputs from the first and second sets of integrators.

3. The apparatus of claim 2 wherein the switching means comprises:
   (i) an alternating shift register means for producing a series of time-shifted stored copies of a digital character, and
   (ii) for each multiplier means output, a single-pole, double throw switch responsive to the state of a control signal to connect the multiplier means output to the selected one of the first and second sets of integrator means, the control signal being a selected output of the alternating shift register means.

* * * * *